(12) United States Patent
Ben-Simhon et al.

(10) Patent No.: US 12,013,962 B1
(45) Date of Patent: Jun. 18, 2024

(54) AUTOMATIC ENTRY VALIDATION USING DENSITY BASED CLUSTERING

(71) Applicant: Intuit Inc., Mountain View, CA (US)

(72) Inventors: Yonantan Ben-Simhon, Hod Hasharon (IL); Yair Horesh, Hod Hasharon (IL); Yehezkel Shraga Resheff, Hod Hasharon (IL); Noah Eyal Altman, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 986 days.

(21) Appl. No.: 16/502,757

(22) Filed: Jul. 3, 2019

(51) Int. Cl.
| | |
|---|---|
| G06F 21/62 | (2013.01) |
| G06F 18/23213 | (2023.01) |
| G06F 21/31 | (2013.01) |
| G06N 20/00 | (2019.01) |
| G06Q 40/02 | (2023.01) |
| G06F 3/048 | (2013.01) |

(52) U.S. Cl.
CPC .... *G06F 21/6245* (2013.01); *G06F 18/23213* (2023.01); *G06F 21/31* (2013.01); *G06N 20/00* (2019.01); *G06Q 40/02* (2013.01)

(58) Field of Classification Search
CPC ..... G06F 21/6245; G06F 21/31; G06N 20/00; G06K 9/6223; G06Q 40/02
See application file for complete search history.

(56) References Cited

U.S. PATENT DOCUMENTS

| | | | |
|---|---|---|---|
| 10,147,020 B1* | 12/2018 | Hodson | G06F 18/29 |
| 10,693,872 B1* | 6/2020 | Larson | H04L 9/3231 |
| 2002/0184610 A1* | 12/2002 | Chong | G06F 8/20 717/109 |
| 2003/0071844 A1* | 4/2003 | Evans | G06Q 10/04 715/763 |
| 2008/0040164 A1* | 2/2008 | Curtin | G06Q 10/10 705/4 |
| 2018/0232528 A1* | 8/2018 | Williamson | G06N 5/025 |
| 2018/0268015 A1* | 9/2018 | Sugaberry | G06F 16/24575 |
| 2019/0327271 A1* | 10/2019 | Saxena | G06F 8/38 |
| 2019/0361860 A1* | 11/2019 | Rogynskyy | G06F 16/2379 |
| 2020/0081865 A1* | 3/2020 | Farrar | G06N 20/00 |
| 2020/0151611 A1* | 5/2020 | McGavran | G06F 16/29 |
| 2020/0285939 A1* | 9/2020 | Baker | G06N 3/063 |
| 2020/0410300 A1* | 12/2020 | Arora | H04B 7/18508 |
| 2021/0251503 A1* | 8/2021 | Gurevich | A61B 5/7267 |

\* cited by examiner

*Primary Examiner* — Nicholas Augustine
(74) *Attorney, Agent, or Firm* — DLA PIPER LLP (US)

(57) ABSTRACT

An entry validation system executed by a processor, may compare an entry into a user interface (UI) field with at least one range of valid entries. The at least one range of valid entries may be generated by a machine learning (ML) system by clustering known valid data using a clustering algorithm producing a lowest number of clusters that absorbs all of the known valid data within the clusters. In response to the comparing, the entry validation system may provide a determination of validity or invalidity to an application displaying the UI field. The determination of validity may cause the entry to be processed by the application, and the determination of invalidity may cause the application to reject the entry.

16 Claims, 4 Drawing Sheets

AUTOMATIC ENTRY VALIDATION USING DENSITY BASED CLUSTERING

DETAILED DESCRIPTION OF SEVERAL EMBODIMENTS

Figure 1:
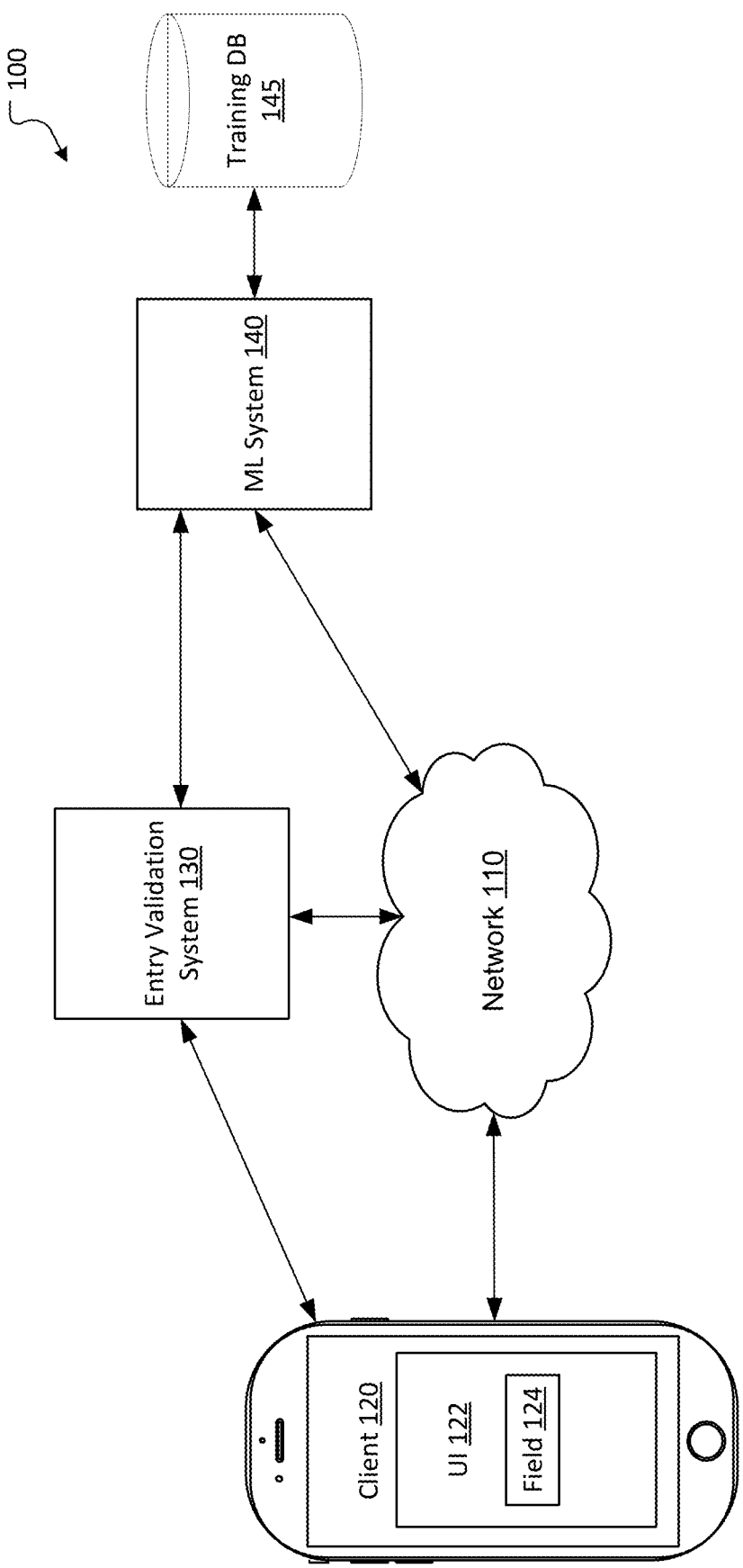
FIG. 1 shows an entry validation system according to an embodiment of the present disclosure.

Many software applications ("apps") may include user interface (UI) elements whereby a user may type, drag, paste, or otherwise enter information into one or more fields. These UIs may include elements whereby the user may save, submit, or otherwise trigger processing of the information in the fields by one or more software routines or backend systems. In some cases, the app may automatically validate data entered into a field, for example automatically determining whether the data corresponds to an expected format and/or whether the data is accurate or includes one or more errors.

As a non-limiting example, some financial apps may ask a user to enter a routing number and/or an account number for a bank account. This may be done for a variety of purposes, such as allowing the app to automatically manage bank account settings, facilitating automatic direct deposit into the bank account, etc. A routing number is a nine-digit number based on an identity of the bank and, in some cases, a region in which the bank account was opened. Routing numbers may be standardized across bank accounts and may be publicly available (e.g., in lookup tables or other services provided by the American Bankers Association and/or other authorities). Accordingly, routing numbers may be verified using a lookup table or other basic processing. On the other hand, account numbers may be of unfixed length and format and may be assigned to bank accounts individually by banks themselves as the accounts are opened. Given the length, complexity, and variability of account numbers, users entering these numbers into UI fields may be prone to entering them erroneously. Proactive account number validation before submission may reduce user attrition and improve revenue and user experience, for example preventing downstream problems with direct deposits or other automatically triggered bank interactions.

For data such as account numbers, automatic entry validation may present one or more specific problems. For example, prefix/suffix digit-based features and/or number length-based features may be incapable of capturing many invalid account numbers, which may be extremely rare compared to the valid classes of account numbers. Accordingly, instead of analyzing entries for prefix/suffix digit-based features and/or number length-based features, or as a complementary analysis, embodiments disclosed herein may use the natural tendency of account numbers of a given financial institution and/or branch to be clustered together in groups (e.g., ranges of numbers that are relatively close together) with substantial gaps between these clusters. This phenomenon may be a result of the fact that these numbers are distributed to the branches as a series starting from a fixed point, which may be far from the ending point of the previous series. Disclosed embodiments may leverage one or more machine learning (ML) techniques as described herein to analyze these number groups and identify valid and/or invalid ranges for account numbers. The more data points accumulated by the disclosed embodiments, the more certain it may become that a certain gap is an invalid range, enabling the disclosed automated systems and/or methods to alert the user prior to submission.

Embodiments disclosed herein are not directed to improvements in data entry detection and/or classification in itself, but rather to improvements in the accuracy, speed, and/or efficiency of computer-based data entry detection and/or classification specifically. For example, humans may be uniquely adept at noticing data anomalies based on deep personal knowledge and/or pattern recognition. However, due to the great many differences between how a human brain processes information and how a computer processes information, problems arise when data entry detection and/or classification is automated. Accordingly, the disclosed embodiments have been developed specifically to address problems that only occur in automatic, computer-based data entry detection and/or classification contexts. The disclosed embodiments improve automatic, computer-based data entry detection and/or classification in several specific ways which are discussed throughout this specification. Moreover, while bank account numbers are used as examples herein, the disclosed techniques may be useful to validate other types of data formulated in similar fashion (e.g., assigned from similarly situated cluster elements that are far apart from other clusters).

Figure 4:
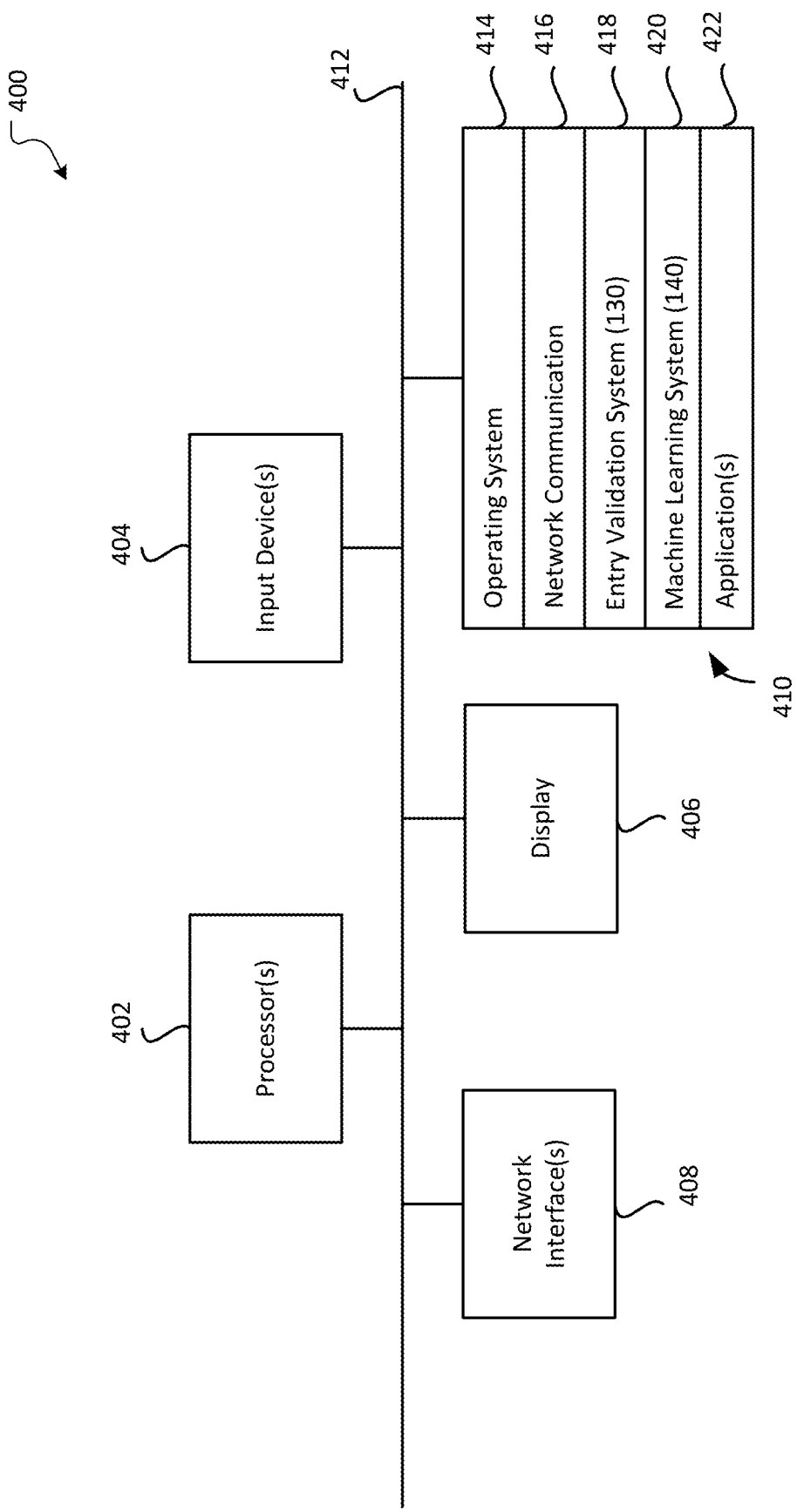
FIG. 4 shows a computing device according to an embodiment of the present disclosure.

FIG. 1 shows an entry validation system 100 according to an embodiment of the present disclosure. System 100 may include a plurality of functional elements that may be provided by one or more computing devices (e.g., one or more computing devices 400 as shown in FIG. 4). These elements may work together to automatically validate field entries and/or perform training.

For example, system 100 may include at least one client 120. Client 120 may be any device configured to present UIs 122 including one or more fields 124 and receive inputs thereto in the fields 124. For example, client 120 may be a smartphone, personal computer, tablet, laptop computer, or other device.

System 100 may include entry validation system 130. In some embodiments, entry validation system 130 may be a hardware and/or software component of client 120. In some embodiments, entry validation system 130 may be a hardware and/or software component accessible to client 120 through network 110 (e.g., entry validation system 130 may be hosted by a server computer). As described in greater detail below, entry validation system 130 may validate data entered into fields 124, for example determining whether bank account numbers entered into fields 124 are valid.

System 100 may include ML system 140, which may be a hardware and/or software component accessible to client 120 through network 110 in some embodiments (e.g., ML system 140 may be hosted by a server computer). As described in greater detail below, ML system 140 may use data from training database 145 and/or other sources to train entry validation system 130 to validate data entered into fields 124.

In some embodiments, one or more of client 120, entry validation system 130, and/or ML system 140 may communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

A single client 120 and separate, single entry validation system 130 and ML system 140 are shown for ease of illustration, but those of ordinary skill in the art will appreciate that these elements may be embodied in different forms for different implementations. For example, system 100 may include a plurality of clients 120, many of which may access different data. Moreover, single entry validation system 130 and/or ML system 140 may each be components of a single computing device (e.g., computing device 400 described below), or a combination of computing devices may provide single entry validation system 130 and/or ML system 140. In some embodiments, the operations performed by client 120 and at least one of the separate, single entry validation system 130 and/or ML system 140 may be performed on a single device (e.g., without the various components communicating using network 110 and, instead, all being embodied in a single computing device).

Figure 2:
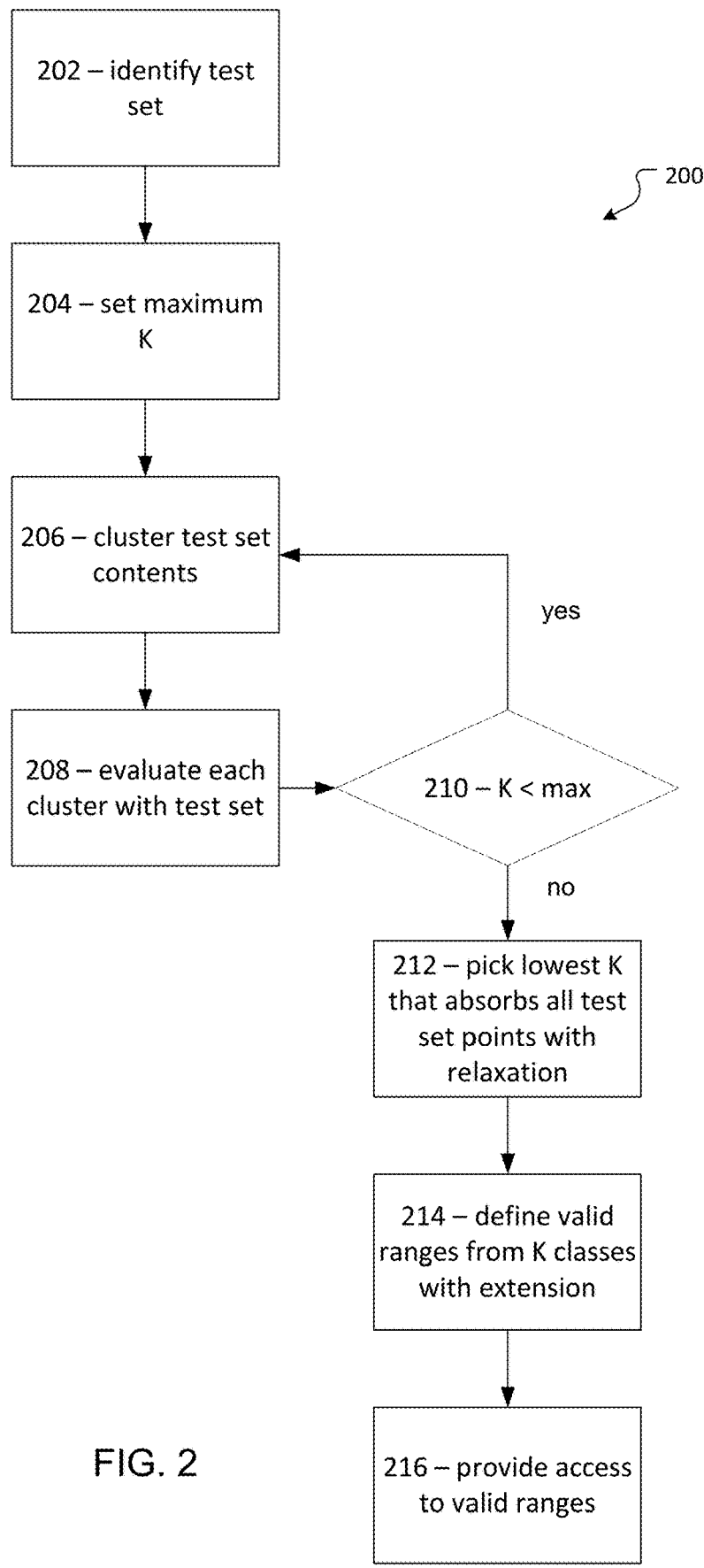
FIG. 2 shows an entry validation system training method according to an embodiment of the present disclosure.

To facilitate processing by entry validation system 130, ML system 140 may process training data. FIG. 2 shows an entry validation system training method 200 that may be performed by ML system 140 according to an embodiment of the present disclosure. Training method 200 may determine valid data ranges for field 124 entries, such as valid bank account numbers for fields 124 in which a user is asked to enter a bank account number.

At 202, ML system 140 may identify a test set of data. The test set may be known to include only valid data. For example, in evaluating bank account numbers, a test set may be defined based on one or more routing numbers. ML system 140 may receive a set of bank account numbers associated with a particular routing number. These bank account numbers may be known, valid numbers assigned to actual, valid accounts. ML system 140 may check the set to determine whether there are at least a predefined minimum number of bank account numbers associated with the routing number. If so, ML system 140 may select the set of bank account numbers associated with the routing number as the test set. Process 200 may be performed multiple times on multiple sets of bank account numbers each associated with a different routing number in some embodiments. In other embodiments, ML system 140 may receive multiple routing numbers and bank account numbers associated therewith and may select a subset of the bank account numbers (e.g., 10% of the available numbers or some other subset) as the test set. In some embodiments, ML system 140 may pick a subset of clusters depending on what routing number the user enters. In some embodiments, ML system 140 may test the user's entry against all clusters. For example, this may allow ML system 140 to test an entry of a bank account number when no routing number is given and, if the user's entry is found to be valid and associated with a routing number, the routing number may be used and/or filled in automatically.

At 204, ML system 140 may set a maximum K value and/or other test parameters. For example, ML system 140 may be configured to perform supervised learning clustering using one or more algorithms such as the K-means clustering algorithm, DB SCAN, hierarchical clustering methods for cases wherein there is appropriate structure in the data, clustering using representatives (CURE), and/or others.

In K-means clustering, the test set may be processed so that each element in the set is grouped into one of K clusters. As described below, one goal of process 200 may be to identify a minimum K that absorbs all data points within the test set. ML system 140 may set a maximum K value that is likely to be larger than the minimum K. Any maximum K value may be chosen, such as K=10 or K=100 or some other value. In the following portions of process 200, ML system 140 may perform cycles of generating clusters for increasing K values and evaluating the clusters until clusters generated at the maximum K value are evaluated.

At 206, for a selected K value less than or equal to the maximum, ML system 140 may form K clusters from the values within the test set. For example, ML system 140 may use the test set as inputs to a K-means clustering algorithm with K initially set to 1. ML system 140 may process the K-means clustering algorithm to output a single cluster. As described below, subsequent processing may repeat 206 to generate 2 clusters, 3 clusters, etc., until the maximum K value is reached.

At 208, ML system 140 may evaluate each cluster generated at 206 using the test set. To evaluate the clusters, ML system 140 may check whether all data points within the test set are grouped within a cluster. ML system 140 may represent all data points that are grouped within each cluster as a list of values. ML system 140 may compare the list of values against a list of all values for all data points within the test set. For example, assume there is a single cluster. Assume the data set includes values 1, 4, 5, 6, and 10. Assume 4, 5, and 6 were grouped into the single cluster at 206. Then, ML system 140 may compare the list 4, 5, 6 to the list 1, 4, 5, 6, 10. ML system 140 may determine that 1 and 10 were not clustered. ML system 140 may store this result, for example storing an indication that K=1 does not result in all values in the test set fitting into the cluster.

At 210, ML system 140 may determine whether K is less than the maximum K value set at 204. If so, ML system 140 may increase K and repeat 206 and 208. For example, after the cycle of 206 and 208 described above, ML system 140 may increase K to 2. At 206, ML system 140 may generate two clusters from the test set. At 208, ML system 140 may compare a list of all values in both clusters to the total list of values in the test set. This may be repeated until ML system 140 has performed processing at 206 and 208 for the maximum K value.

At 212, after ML system 140 has performed processing at 206 and 208 for the maximum K value, ML system 140 may select the lowest K value of those tested at 206-210 wherein all values in the test set appear in the list of all clustered values. In some embodiments, ML system 140 may apply a relaxation parameter to choose the lowest K value. The relaxation parameter may allow ML system 140 to select a lower K value than the first value wherein all values in the test set appear in the list of all clustered values if the relaxation parameter is satisfied. An example relaxation parameter may specify that a value in the test set that does not appear in the list of all clustered values may be added to the list of all clustered values (thereby satisfying the requirement that the lowest K value have clusters that absorb all test set values) if the distance of the value that does not appear is closer to an edge value of one cluster than an edge value of any other cluster by some multiplier (a "class edge ratio"). For example, assume one cluster has values 10-20 and another cluster has values 100-110. However, there may be an unclustered test value of 21. Here, 21 is 1 away from the first cluster and 79 away from the second cluster. If 21 is N times closer to 20 than to 100, 21 ML system 140 may group 21 with the first cluster and thereby expand the first cluster to include values 10-21, where N is a class edge ratio. For example, class edge ratio may require a value to be ten times closer to one cluster than any other to be counted as part of the one cluster, or closer by another multiple (e.g., 20 times closer, 100 times closer, etc.).

At 214, ML system 140 may use the clusters for the lowest K value (including relaxation, if applicable) to define valid ranges for subsequent field entry validation processing. For example, ML system 140 may store the clusters as valid ranges for entry values (e.g., valid ranges for bank account numbers). In some embodiments, ML system 140 may apply an extension to the valid ranges. The extension may supply a tolerance level to allow for the creation of new valid entries and/or account for unknown valid entries. For example, ML system 140 may extend the lowest and highest values of the clusters by 5% or 10% or some other extension. In this case, ML system 140 may store the extended clusters as valid ranges for entry values.

At 216, ML system 140 may provide the valid ranges defined at 214 to entry validation system 130. As described below with respect to FIG. 3 and process 300, entry validation system 130 may evaluate entries against the valid ranges to validate or invalidate the entries. In some embodiments, process 200 may be repeated occasionally or periodically to ensure that the valid ranges remain valid as new data points (e.g., new bank account numbers) are added to the ecosystem.

Figure 3:
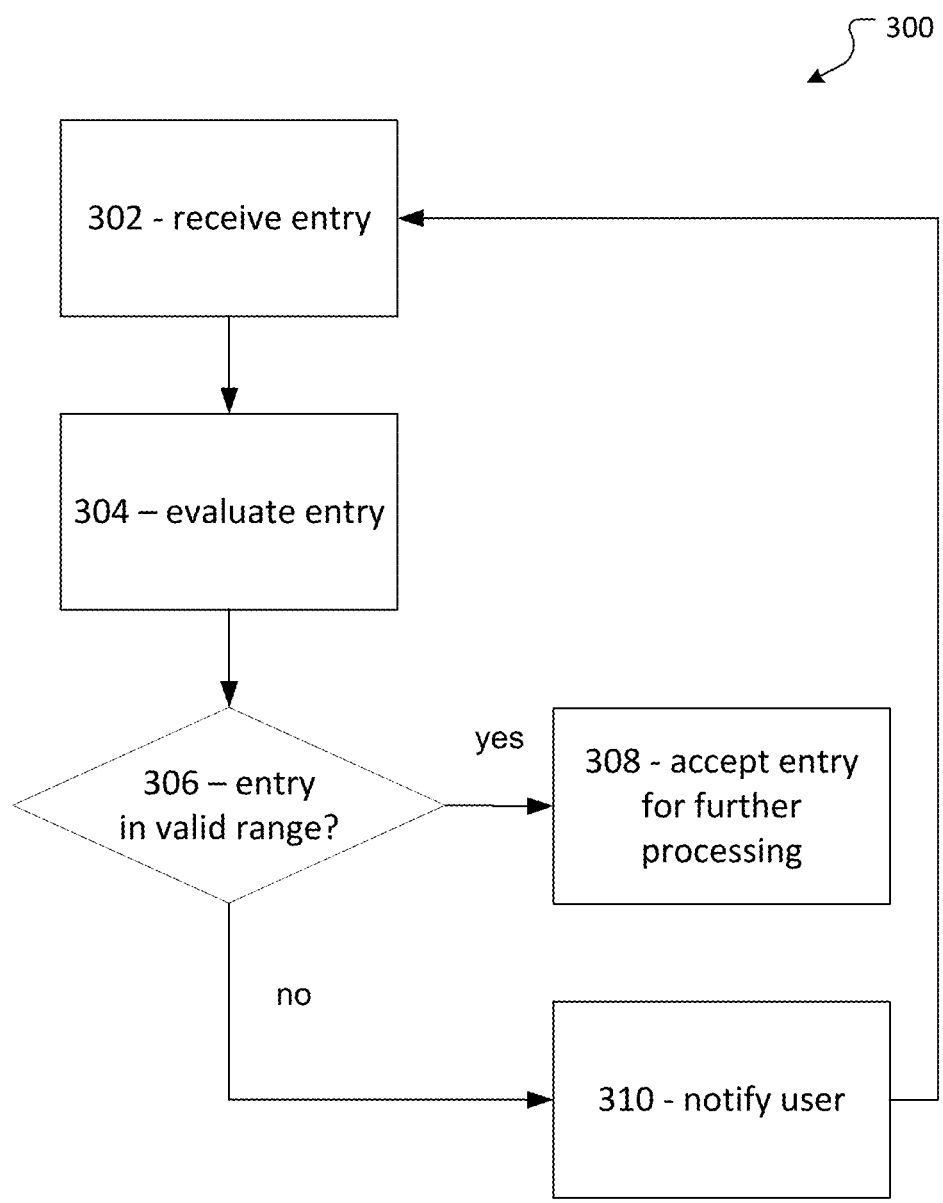
FIG. 3 shows an entry validation method according to an embodiment of the present disclosure.

Entry validation system 130 may leverage the results of training performed by ML system 140 to validate entries in fields 124. FIG. 3 shows an entry validation method 300 that may be performed by entry validation system 130 according to an embodiment of the present disclosure. Validation method 300 may evaluate data entered into a field 124 against the results of training method 200 to determine whether the data is valid and allow UI 122 to respond accordingly.

At 302, entry validation system 130 may receive data entered into field 124. For example, a user may enter data into field 124 of UI 122. UI 122 may provide functionality allowing the user to submit the data (e.g., a button to advance a page or submit entered data or the like, the ability to press an "enter" key on a keyboard or touchscreen soft keyboard, etc.). Upon receiving a user command to submit the data, UI 122 may pass the data to entry validation system 130. In some embodiments, UI 122 may pass the data to entry validation system 130 without explicit user command to submit data (e.g., after a certain amount of time has passed from when the user entered the data, after the user selects another field 124 or element of UI 122, etc.).

At 304, entry validation system 130 may evaluate the data entered into field 124 that was received at 302 against one or more valid ranges for the data. For example, entry validation system 130 may use the data provided by ML system 140 at 216 in process 200. Entry validation system 130 may compare the data entered into field 124 with the one or more valid ranges for the data to determine whether the data entered into field 124 is inside one of the valid ranges for the data or not. In a simple example, assume a valid range for a bank account number entered into field 124 is 10000001-10009999. Assume a user enters 10002000. This entry is within the valid range. Assume the user enters 11002000. This entry is outside the valid range.

At 306, based on the comparing at 304, entry validation system 130 may determine that the data is valid if it is inside one of the valid ranges or invalid if it is not inside any of the valid ranges. For example, if field 124 asks for a user's bank account number, entry validation system 130 may determine whether the number entered by the user is a valid bank account number.

At 308, in response to determining that the data is valid at 306, entry validation system 130 may accept the entry for further processing. This may include indicating to the app operating UI 122 that the data may be processed in any fashion in which the app is configured to process the data.

At 310, in response to determining that the data is not valid at 306, entry validation system 130 may cause UI 122 to notify the user. For example, UI 122 may display an indication that the data is not valid and/or may prevent the user from submitting the data. A user may submit new data, which may restart process 300. For example, entry validation system 130 may receive the new data at 302, evaluate it at 304, mark it as valid or not at 306, and proceed accordingly at 308 or 310. This may be repeated until entry validation system 130 determines that the entry is valid.

FIG. 4 shows a computing device according to an embodiment of the present disclosure. For example, computing device 400 may function as client 120 (which may include entry validation system 130 in some embodiments; one or more servers or other devices configured to provide entry validation system 130 and/or ML system 140; or a portion or combination thereof in some embodiments. The computing device 400 may be implemented on any electronic device that runs software applications derived from compiled instructions, including without limitation personal computers, servers, smart phones, media players, electronic tablets, game consoles, email devices, etc. In some implementations, the computing device 400 may include one or more processors 402, one or more input devices 404, one or more display devices 406, one or more network interfaces 408, and one or more computer-readable mediums 410. Each of these components may be coupled by bus 412, and in some embodiments, these components may be distributed among multiple physical locations and coupled by a network.

Display device 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device 404 may be any known input device technology, including but not limited to a keyboard (including a virtual keyboard), mouse, track ball, and touch-sensitive pad or display. Bus 412 may be any known internal or external bus technology, including but not limited to ISA, EISA, PCI, PCI Express, NuBus, USB, Serial ATA or FireWire. Computer-readable medium 410 may be any medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 410 may include various instructions 414 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 412. Network communications instructions 416 may establish and maintain network connections (e.g., software for implementing communication protocols, such as TCP/IP, HTTP, Ethernet, telephony, etc.).

Entry validation system instructions 418 may include instructions that enable computing device 400 to function as entry validation system 130 and/or to provide entry validation system 130 functionality as described herein. ML system instructions 420 may include instructions that enable computing device 400 to function as ML system 140 and/or to provide ML system 140 functionality as described herein.

Application(s) 422 may be an application that uses or implements the processes described herein and/or other processes. The processes may also be implemented in operating system 414. For example, application 422 and/or operating system 414 may present UIs 122 including fields 124 which may be processed by entry validation system 130 as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of validating an entry into a user interface (UI) field, comprising:
    identifying a set of data that contains known valid data;
    generating one or more clusters of known valid data using a clustering machine learning (ML) model such that a number of clusters is based on a lowest number of clusters that absorb all of the known valid data, wherein the ML model applies a relaxation parameter that specifies a value in the set of data that is not in the list of all clustered values and the value is added to the list when the distance of the value is closer to an edge value of one cluster than a class edge ratio of the clustered values;

comparing, by an entry validation system executed by a processor, each cluster with the entry; and in response to the comparing, providing, by the entry validation system, a determination of validity or invalidity to an application displaying the UI field, wherein the determination of validity causes the entry to be processed by the application and the determination of invalidity causes the application to reject the entry.

2. The method of claim 1, the generating comprising applying, by the ML model, a relaxation to at least one of the clusters, the relaxation extending the at least one of the clusters to incorporate a data point within the known valid data that was not included in the at least one of the clusters by the ML model.

3. The method of claim 2, wherein the relaxation incorporates the data point in response to the data point being closer to any other cluster by a multiplier.

4. The method of claim 1, the generating comprising extending, by the ML model, at least one of a lower and an upper bound of each of the clusters by an extension rate.

5. The method of claim 1, the generating comprising executing the ML model a plurality of times to generate a plurality of groupings of clusters and determining the lowest number of clusters by comparing data points within the clusters to all of the known valid data for each grouping of clusters to identify the grouping that has the lowest number of clusters and absorbs all of the known valid data.

6. The method of claim 1, wherein the known valid data comprises a plurality of bank account numbers, the method further comprising selecting, by the ML model executed by the processor, the plurality of bank account numbers by determining that at least one routing number is associated with a minimum number of bank account numbers to form a useable set of known valid data.

7. The method of claim 1, wherein the clustering ML model utilizes K-means clustering.

8. A machine learning (ML) and entry validation system comprising:
 a memory;
 a transceiver; and
 a processor in communication with the memory and the transceiver and configured to perform at least the following functions:
  identifying a set of data that contains known valid data;
  generating one or more clusters of known valid data using a clustering machine learning algorithm producing a such that a number of clusters is based on a lowest number of clusters that absorbs all of the known valid data, wherein the machine learning algorithm applies a relaxation parameter that specifies a value in the set of data that is not in the list of all clustered values and the value is added to the list when the distance of the value is closer to an edge value of one cluster than a class edge ratio of the clustered values;
  storing the each cluster in the memory;
  receiving, by the transceiver, an entry into a user interface from a client device;
  comparing the entry with each of the stored cluster;
  in response to the comparing, providing a determination of validity or invalidity to an application displaying the user interface, wherein the determination of validity causes the entry to be processed by the application and the determination of invalidity causes the application to reject the entry; and
  sending, by the transceiver, the determination of validity or invalidity to the client device in response to the receiving.

9. The system of claim 8, wherein the generating comprises applying a relaxation to at least one of the clusters, the relaxation extending the at least one of the clusters to incorporate a data point within the known valid data that was not included in the at least one of the clusters by the clustering algorithm.

10. The system of claim 9, wherein the relaxation incorporates the data point in response to the data point being closer to any other cluster by a multiplier.

11. The system of claim 8, wherein the generating comprises extending at least one of a lower and an upper bound of each of the clusters by an extension rate.

12. The system of claim 8, wherein the known valid data comprises a plurality of bank account numbers, and the processor is further configured to select the plurality of bank account numbers by determining that at least one routing number is associated with a minimum number of bank account numbers to form a useable set of known valid data.

13. The system of claim 8, wherein the clustering algorithm comprises K-means clustering.

14. A client device comprising:
 a display;
 an input device; and
 a processor in communication with the display and the input device and configured to perform at least the following functions:
  presenting, by the display, a user interface (UI) including a field;
  receiving, by the input device, an entry into the field;
  identifying a set of data that contains known valid data;
  generating one or more clusters of known valid data using a clustering machine learning algorithm such that a number of clusters is based on a lowest number of clusters that absorb all of the known valid data, wherein the machine learning algorithm applies a relaxation parameter that specifies a value in the set of data that is not in the list of all clustered values and the value is added to the list when the distance of the value is closer to an edge value of one cluster than a class edge ratio of the clustered values;
  comparing each cluster with the entry; and
  in response to the comparing, providing a determination of validity or invalidity, wherein the determination of validity causes the entry to be processed by the processor and the determination of invalidity causes a rejection of the entry to be displayed by the display.

15. The client device of claim 14, wherein the UI further includes an indication to enter a bank account number in the field.

16. The client device of claim 14, wherein the rejection includes an indication that the entry is not a valid bank account number.

* * * * *